June 16, 1959

R. A. JOHNSON, JR 2,890,848

MAGNETIZED CLAMP FOR CONDUIT

Filed June 25, 1957

INVENTOR.
Robert A. Johnson, Jr.
BY

United States Patent Office 2,890,848
Patented June 16, 1959

2,890,848

MAGNETIZED CLAMP FOR CONDUIT

Robert A. Johnson, Jr., Longmeadow, Mass.

Application June 25, 1957, Serial No. 667,927

1 Claim. (Cl. 248—74)

This invention relates to means for holding a conduit or the like for delivering fluid, air or the like relative to a machine or component thereof.

The principal object of the invention is directed to a holder or clamp for a conduit which is adapted to be magnetically attached to a machine or to a component thereof for positioning the conduit relative thereto.

In connection with machines of all types, such as various types of machine tools, it is often desired and necessary to conduct to a certain portion of the machine liquids such as lubricants, cutting oils, coolants, air, or the like. This, according to prior practise, has necessitated drilling and/or tapping holes in the machine for the securement of a conduit holder which clamps the conducting conduit, which conduit may be in the form of a pipe, tube, hose or the like.

According to the prior practise, it is oftentimes desirable to vary the position of the holder which requires not only making objectionable the holes in the machine but also losing time and expense involved in providing such additional holes.

According to the novel features of this invention, a device is provided in the form of a conduit holder or clamp, which has a magnetic portion to facilitate the holder in being releasably attached to any desired portion of a machine. This enables various liquids or air to be directed onto that component of the machine as desired. The position of the holder may be easily and readily varied at will on the machine so as to accurately locate the distribution of liquid, air and the like from the conduit.

According to a special feature of the invention, means is provided in cooperation with the holder to receive and clamp conduits of various diameters whereby a single holder may be used with conduits of various diameters.

In a general way, the holder of the invention is formed with a magnetized face, provided by a permanent magnet, of one of the well known types. Thereby the holder may be releasably secured to machines having frames, beds or other components formed from material to which the magnet will be attracted.

Figure 1:
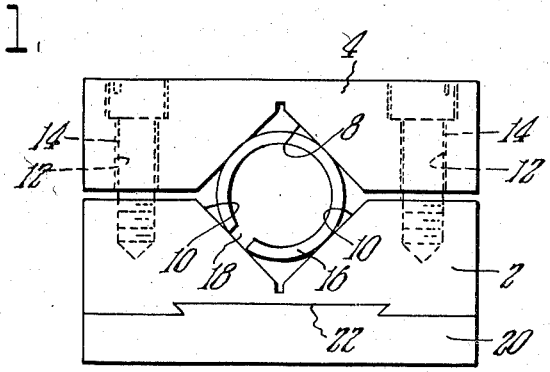
Figure 2:
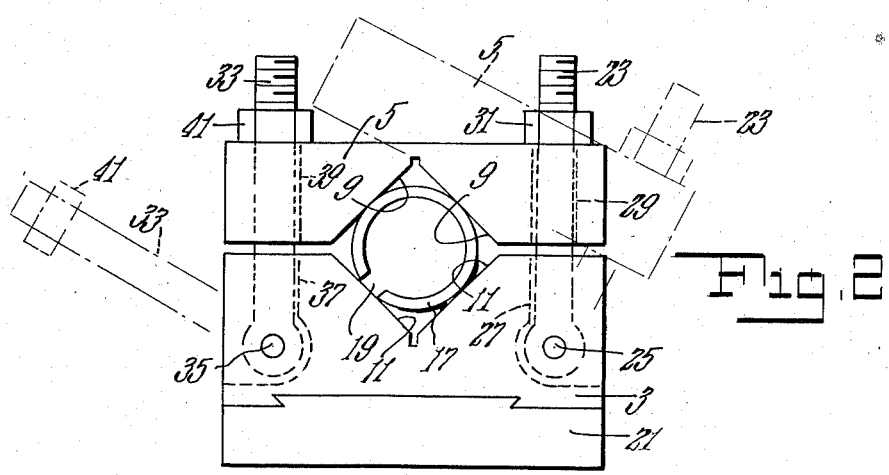
Figure 3:
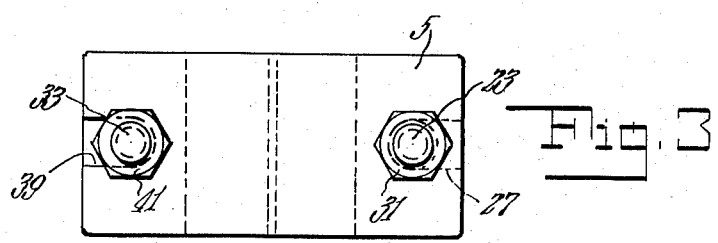

Various changes and modifications may be made in the form of a device embodying the spirit and scope of the invention to be disclosed in the present preferred form thereof in connection with the drawings wherein:

Fig. 1 is a side elevational view of a conduit holder embodying the novel features of the invention; and Figs. 2 and 3 are side elevational views of a modified form of the invention.

Referring now to the drawings more in detail, the invention will be fully described.

A body and cap 2 and 4 respectively of a holder, as shown in Fig. 1, are preferably formed from a suitable metal and are provided with angularly disposed surfaces 8, 8, and 10, 10, forming cooperating seats.

Screws 12 extend somewhat loosely through holes 14 in the cap 4 and are in threaded engagement with the body 2, as shown.

A conduit for a liquid, air or the like, may extend between the seats and the screws 12 may be tightened to secure the conduit between the body and cap.

It may be desirable to employ an elongated bushing 16 which may be split longitudinally at 18 so as to be contractable. Several such bushings may be provided having different interior diameters so as to accommodate conduits within a wide range of sizes.

As the screws are tightened with a conduit in said bushing, the bushing will be contracted to clamp the conduit against movement relative to the holder.

A magnet member 20 is provided and is of permanent magnet material.

Said member 20 will be secured to one of the members of the holder, such as the body 2. The member 20 may be secured to the body in various ways but, according to the disclosure, there may be a dovetail connection 22, as shown.

With a conduit clamped in the holder, it may be attached to a machine or component thereof by placing the magnet member 20 thereon.

Machines of various types commonly have metal beds, frames and other components so that the holder may be releasably held in place by the magnetic action to deliver liquids, air or the like to the location desired. The holder may be readily and quickly relocated as may be desired.

According to the form of the invention shown in Figs. 2 and 3, a body and cap 3 and 5 respectively are provided with angularly related faces 9 and 11 forming seats to receive a conduit or a bushing such as 17 split at 19, as in the former case.

A magnet member 21 is secured to the body, as in the former case, for the same purpose and function.

A bolt 23 has a lower end portion pivoted at 25 in a slot 27 of the body 3. The upper end of the bolt 23 extends through an opening 29 of the cap 5, and a nut 31 is in threaded engagement therewith.

Another bolt 33 has a lower end pivoted at 35 in a slot 37 of the body. The bolt is swingable on the pivot 35 in and out of the slot 37 of the body and in and out of the slot 39 of the cap. A nut 41 is in threaded engagement with the upper end of the bolt 33.

With the nuts 31 and 41 loosened on the bolts, the bolt 33 may be swung outwardly of the slots 37 and 39 of the body and cap respectively. Then the cap 5 and bolt 23 may swing on the pivotal connection 25.

With such swinging of the parts a conduit or bushing on a conduit may be readily and quickly inserted between or withdrawn from between the body and cap. In this form of the invention, the parts need not be separated for inserting or withdrawing a conduit.

Having described the invention in the form at present preferred, it is desired to be limited, if at all, by the appended claim rather than the foregoing description.

I claim:

In a magnetic clamp device for holding a conduit relative to a component of a machine comprising, a lower body and an upper cap having inner faces and corresponding opposite ends provided with outer end faces, said inner faces of the body and cap provided with opposed cooperating V grooves thereacross, an elongated tubular bushing in said grooves provided with a longitudinal groove through the side wall thereof whereby said member is compressible onto a conduit extending therethrough as said cap and body are urged towards one another, said body provided at one end thereof with a slot extending downwardly and inwardly from the inner and end faces thereof, the corresponding end of the cap provided with an opening therethrough, a first threaded bolt having a lower end pivoted in the slot of the body and extending through the opening of the cap, said bolt having a nut thereon for bearing on said cap whereby as said nut is turned in tightening direction the ends of the cap and body are urged towards one another for compressing said bushing and as said nut is turned in a loosening direction said cap is swingable by said first bolt for separation of the inner faces of said cap and body, said body provided at an opposite end thereof with a slot extending downwardly and inwardly from the inner and end faces thereof, the corresponding opposite end of said cap provided with a slot open at inner and end faces thereof, a second threaded bolt having a lower end pivoted in the slot of the opposite end of the body swingable into and out of the slot of the said opposite end of the into and out of the slot of the said opposite end of the cap, said second bolt having a nut thereon for bearing on said cap whereby with the bolt in the slot of the cap and the nut turned in tightening direction the end of the cap and body are urged towards one another and as the nut is turned in loosening direction the bolt is swingable from the slot of the cap for swinging of the cap relative to the body and separation of the inner faces of the cap and body on a permanent magnet secured to said body.

References Cited in the file of this patent

UNITED STATES PATENTS

| | | |
|---|---|---|
| 318,182 | Guhl | May 19, 1885 |
| 952,184 | Carver | Mar. 15, 1910 |
| 1,561,554 | Little | Nov. 17, 1925 |